United States Patent
Shaffer, Jr. et al.

(10) Patent No.: US 12,456,349 B2
(45) Date of Patent: Oct. 28, 2025

(54) GAMING SYSTEMS WITH BLOCKCHAIN JACKPOTS

(71) Applicant: Aristocrat Technologies, Inc., Las Vegas, NV (US)

(72) Inventors: Stephen Shaffer, Jr., Las Vegas, NV (US); Frank Rodriguez, Las Vegas, NV (US); Xiaoqiang Gong, Henderson, NV (US); Rajendrasinh Jadeja, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 399 days.

(21) Appl. No.: 17/951,922

(22) Filed: Sep. 23, 2022

(65) Prior Publication Data

US 2023/0130583 A1    Apr. 27, 2023

Related U.S. Application Data

(60) Provisional application No. 63/270,391, filed on Oct. 21, 2021.

(51) Int. Cl.
| | |
|---|---|
| *G07F 17/32* | (2006.01) |
| *G06F 7/58* | (2006.01) |
| *H04L 9/08* | (2006.01) |
| *H04L 9/32* | (2006.01) |

(52) U.S. Cl.
CPC .................. *G07F 17/3258* (2013.01)

(58) Field of Classification Search
None
See application file for complete search history.

(56) References Cited

U.S. PATENT DOCUMENTS

2020/0342479 A1*  10/2020  Buck ................... H04L 9/0643
2023/0033600 A1*   2/2023  Nelson ............... H04L 9/3236

* cited by examiner

*Primary Examiner* — Lawrence S Galka
(74) *Attorney, Agent, or Firm* — Armstrong Teasdale LLP

(57) ABSTRACT

A blockchain system comprising a plurality of electronic gaming devices configured to perform proof of work computations and a processor configured to: collect transaction data from a blockchain; create a block body that includes the transaction data; transmit a message to a set of electronic gaming devices that includes the block body; receive, from a first electronic gaming device, a success message that includes at least a nonce string; create a new block for the blockchain that includes at least the block body and the nonce string; transmit the new block into the blockchain, thereby causing the new block to be added to the blockchain; identify a mining reward on the blockchain based on the adding of the new block, the mining reward being in a first value of cryptocurrency supported by the blockchain; and increment a progressive jackpot by the first value, the progressive jackpot being provided in the cryptocurrency.

20 Claims, 10 Drawing Sheets

GAMING SYSTEMS WITH BLOCKCHAIN JACKPOTS

CROSS-REFERENCE TO RELATED APPLICATIONS

The present application claims the benefit of priority to U.S. Provisional Patent Application No. 63/270,391, filed on Oct. 21, 2021, entitled "GAMING SYSTEMS WITH BLOCKCHAIN JACKPOTS", which is herein incorporated by reference in its entirety.

TECHNICAL FIELD

The disclosure relates generally to the field of electronic gaming devices, gaming systems, and supporting blockchain systems within a regulated gaming environment. More particularly, but not by way of limitation, this disclosure relates to blockchain technologies supporting jackpots and other electronic gaming activities.

BACKGROUND

Electronic gaming machines (EGMs) or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of a game instance (or single play) of a primary or base game. In some cases, a player may qualify for a special mode of the base game, a secondary game feature, or a bonus game feature of the base game by attaining a certain winning combination or triggering event in, or related to, the base game, or after the player is randomly awarded the special mode, secondary game feature, or bonus game feature. In the special mode, secondary game feature, or bonus game feature, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

Typical games use a random number generator (RNG) to randomly determine the outcomes for the games (also referenced throughout the disclosure as a "random based game outcome"). Examples of random based game outcomes include slots, video poker, video blackjack, video pachinko, keno, bingo, and lottery outcomes. The games are also designed to return a certain percentage of the amount wagered back to the player over the course of many rounds of play or game instances, which is generally referred to as return to player (RTP) for a game. The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

Some known EGMs provide jackpots (e.g., "progressives"). With progressive jackpots, the EGM typically contributes a particular amount for each game round (e.g., a predetermined amount per wager, a percentage of each wager). These small amounts are added to the progressive, accumulating over time as a jackpot available to be won by the player. The current value of the progressive is typically displayed on a progressive jackpot meter at or near the EGM to inform nearby players of the current size of the jackpot. The EGMs typically have a pre-defined win condition that will trigger the player to win the progressive jackpot (e.g., 5 special symbols on a slot machine, royal flush on a poker machine, or such). When the player triggers a win for the progressive jackpot, the player is paid the current total and the progressive is typically reset to a base amount, allowing the progressive to begin increasing again.

Some progressives are local to a single EGM (referred to herein as "stand-alone progressives"). Other progressives may be pooled between multiple EGMs (referred to herein as "linked progressives"). With such linked progressives, the participating EGMs similarly collect small amounts per play. Those small amounts are added to a linked progressive jackpot, and that linked progressive jackpot is available to be won on any of the participating EGMs. Typically, a central progressive system server is provided as a central accounting device which tracks contributions from each of the participating EGMs, providing jackpot total amounts to each of the EGMs (e.g., for display locally on their own progressive jackpot meters), auditing win events, and conducting progressive resets upon a confirmed win event. Since multiple EGMs are contributing to the same linked progressive, these progressives typically rise faster and may be won more frequently. However, such linked progressives are traditionally supported by special hardware installed within each EGM (e.g., a progressive controller), as well as a central server system that communicates with each of the progressive controllers (e.g., the progressive system server). Such additional hardware provides additional cost to an EGM device and typically requires regular regulatory auditing to ensure compliance with local laws and may present security vulnerabilities or reliability exposures to operators.

SUMMARY

In one aspect, a blockchain system is provided. The blockchain system includes a plurality of electronic gaming devices configured to perform proof of work computations. The blockchain system also includes at least one processor storing instructions that, when executed, cause the at least one processor to: (i) collect transaction data of a plurality of blockchain transactions from a blockchain; (ii) create a block body that includes at least the transaction data of the plurality of blockchain transactions; (iii) transmit a message to a set of electronic gaming devices of the plurality of electronic gaming devices that includes at least the block body; (iv) receive, from a first electronic gaming device of the plurality of electronic gaming devices, a success message that includes at least a nonce string; (v) create a new block for the blockchain that includes at least the block body and the nonce string; (vi) transmit the new block into the blockchain, thereby causing the new block to be added to the blockchain; (vii) identify a mining reward on the blockchain based on the adding of the new block, the mining reward being in a first value of cryptocurrency supported by the blockchain; and (viii) increment a progressive jackpot by the first value, the progressive jackpot being provided in the cryptocurrency.

In another aspect, a computer-implemented method is provided. The computer-implemented method includes collecting transaction data of a plurality of blockchain transactions from a blockchain. The computer-implemented method also includes creating a block body that includes at least the transaction data of the plurality of blockchain transactions. The computer-implemented method further includes transmitting a message to a set of electronic gaming devices of a plurality of electronic gaming devices that includes at least the block body. The computer-implemented method also includes receiving, from a first electronic gaming device of the plurality of electronic gaming devices, a success message that includes at least a nonce string. The computer-implemented method further includes creating a new block for the blockchain that includes at least the block body and the nonce string. The computer-implemented method also includes transmitting the new block into the blockchain, thereby causing the new block to be added to the blockchain. The computer-implemented method further includes identifying a mining reward on the blockchain based on the adding of the new block, the mining reward being in a first value of cryptocurrency supported by the blockchain. The computer-implemented method also includes incrementing a progressive jackpot by the first value, the progressive jackpot being provided in the cryptocurrency.

In yet another aspect, a non-transitory, computer-readable medium is provided. The computer-readable medium stores instructions that, when executed by at least one processor, cause the at least one processor to: (i) collect transaction data of a plurality of blockchain transactions from a blockchain; (ii) create a block body that includes at least the transaction data of the plurality of blockchain transactions; (iii) transmit a message to a set of electronic gaming devices of a plurality of electronic gaming devices that includes at least the block body; (iv) receive, from a first electronic gaming device of the plurality of electronic gaming devices, a success message that includes at least a nonce string; (v) create a new block for the blockchain that includes at least the block body and the nonce string; (vi) transmit the new block into the blockchain, thereby causing the new block to be added to the blockchain; (vii) identify a mining reward on the blockchain based on the adding of the new block, the mining reward being in a first value of cryptocurrency supported by the blockchain; and (viii) increment a progressive jackpot by the first value, the progressive jackpot being provided in the cryptocurrency.

BRIEF DESCRIPTION OF THE DRAWINGS

An example embodiment of the subject matter disclosed will now be described with reference to the accompanying drawings.

DETAILED DESCRIPTION

A blockchain system is provided herein that leverages the computing power of electronic gaming machines ("EGMs") for the benefit of operators and their progressive jackpots. In an example embodiment, a blockchain server participates in a blockchain, including acting as a mining node on the blockchain (e.g., contenting to add new blocks in proof of work contests). The blockchain server utilizes the computing power of a set of electronic gaming machines by dispersing proof of work tasks to each of participating EGMs during each contest (e.g., during each contest to add a new block to the blockchain). Each of these EGMs begin executing the proof of work task (e.g., brute force searching for a solution to the task). If any of the EGMs solves the proof of work task, then that EGM sends the proof back to the blockchain server and the blockchain server submits that proof of work as its own on the blockchain (e.g., attempting to win the right to add the new block to the blockchain, and thereby be rewarded with a mining award). Such mining awards are provided to an account of the blockchain server on the blockchain. In some embodiments, some or all of this mining award is added to one or more progressive jackpots, thus using the mining work of the EGMs to enhance progressive jackpot values. In some embodiments, these progressive jackpots may be provided in the cryptocurrency of the blockchain itself, thus giving players the chance to win cryptocurrency.

Figure 1:
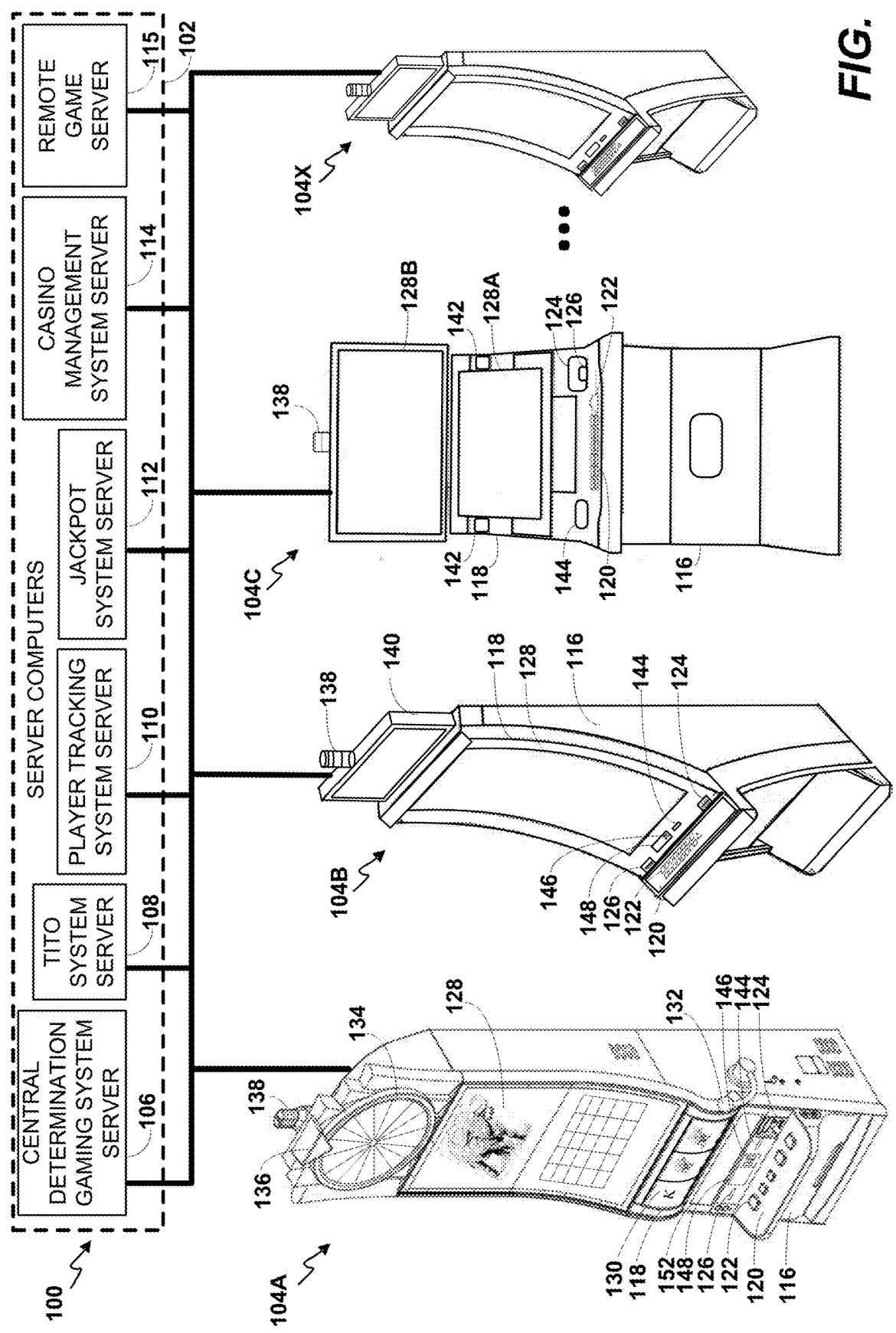
FIG. 1 is an exemplary diagram showing several EGMs networked with various gaming related servers.

FIG. 1 illustrates several different models of EGMs that could be specially configured to generate random based game outcomes using one or more symbol frame mechanic. As shown in FIG. 1, the EGMs, which are more generally referred to as gaming devices 104A-104X, may be networked to various gaming related servers. Shown is a system 100 in a gaming environment including one or more server computers 102 (e.g., slot servers of a casino) that are in communication, via a communications network, with one or more gaming devices 104A-104X (e.g., EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein. The server computers 102 may include a central determination gaming system server 106, a ticket-in-ticket-out (TITO) system server 108, a player tracking system server 110, a jackpot system server 112, a casino management system server 114, and/or a remote game play server 115. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of terminals, gaming devices 104A-104X, and/or other types of gaming devices (e.g., remote gaming devices) that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In some implementations, the bill validator 124 may also function as a "ticket-in" reader that allows the player to use a casino issued credit ticket to load credits onto the gaming device 104A (e.g., in a cashless TITO system). In such cashless implementations, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game feature. Bonus topper wheel 134 is typically used to play a bonus game feature, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.01 or $0.05), paylines, pay tables, and/or various game related graphics. In some implementations, the information panel(s) 152 may be implemented as an additional video display.

Figure 2A:
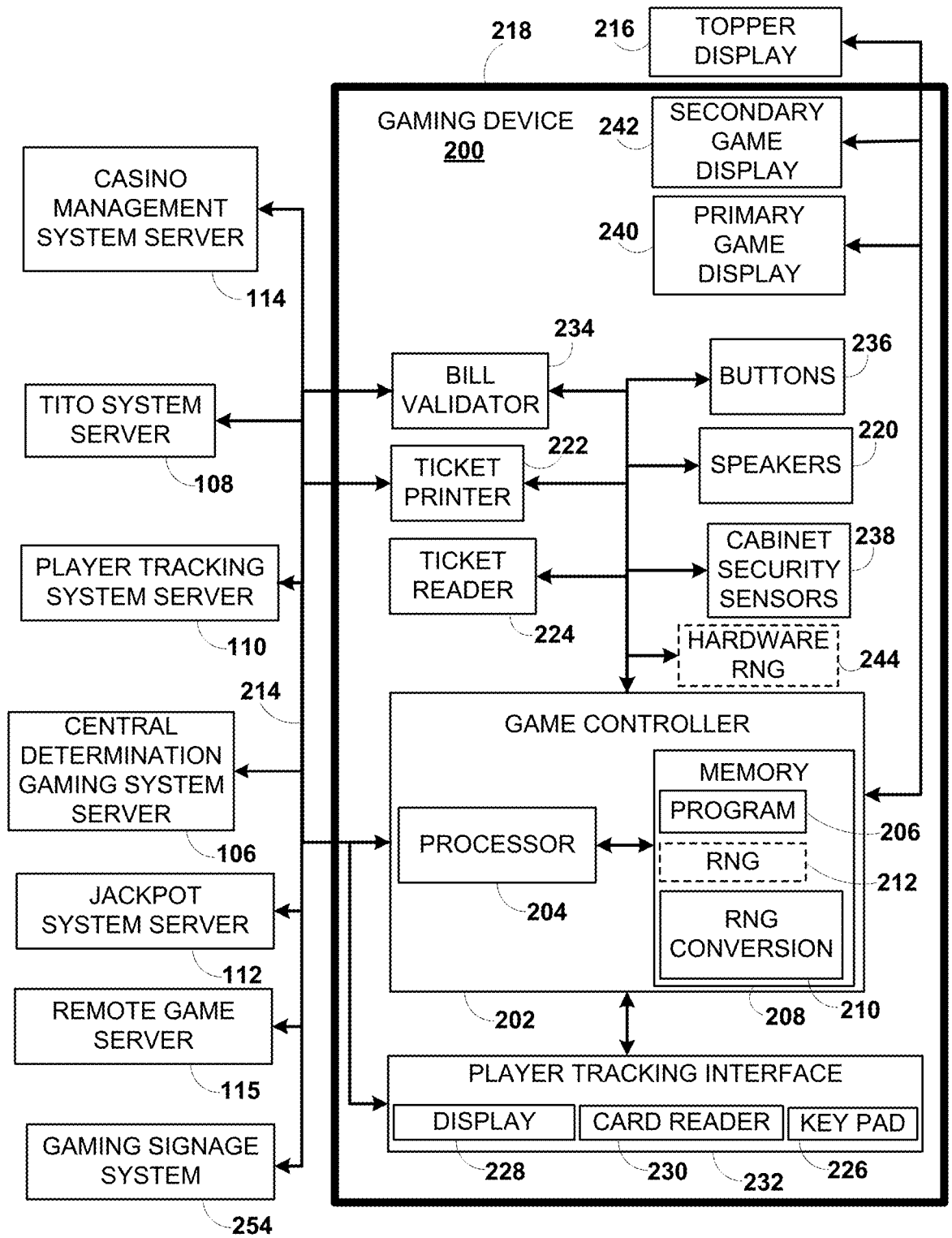
FIG. 2A is a block diagram showing various functional elements of an exemplary EGM.

Gaming devices 104A have traditionally also included a handle 132 typically mounted to the side of main cabinet 116 which may be used to initiate game play. Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game feature display for bonus play, to show game features or attraction activities while a game is not in play, or any other information or media desired by the game designer or operator. In some implementations, the optional topper screen 140 may also or alternatively be used to display progressive jackpots available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus game features, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2A also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that does not retain data values upon loss of power. Nonvolatile memory is memory that does retain data upon a loss of power. Examples of memory 208 include random access memory (RAM), read-only memory (ROM), hard disk drives, solid-state drives, universal serial bus (USB) flash drives, memory cards (e.g., Compact Fast (CFast) memory card), floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more backend gaming systems, such as a central determination gaming system server 106. For purpose of this disclosure, the term "game instance" refers to a play or a round of a game that gaming device 200 presents (e.g., via UI) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred throughout this disclosure as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features (e.g., bonus game feature, special mode, secondary game feature, and/or other supplemental game features). In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a predetermined level of RTP (e.g., RTP of at least 75%) for a game (also referenced throughout the disclosure as a "target game RTP"). A game can use one or more lookup tables (also referenced throughout this disclosure as "weighted tables") as part of a technical solution that satisfies regulatory requirements for randomness and RTP. In particular, a lookup table can integrate game features (e.g., trigger events for special modes or bonus game features; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target game RTP. In general, volatility refers to the frequency or probability of an event such as a special mode, payout, etc. For example, to achieve a specific target game RTP, a higher-volatility game may have a lower payout most of the time with an occasional bonus having a very high payout, while a lower-volatility game has a steadier payout with more frequent bonuses of smaller amounts. Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables and/or reel strips to translate the RNG outcome to a symbol element, stop position for a reel strip, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table and/or reel strips to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment, and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive game credit awards based on the outcome of winning instances. The credit balance is decreased by the amount of each wager and increased upon a win. The player can add additional game credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus game feature or select various items during a feature game). The player may make these selections using the player-input buttons 236, the primary game display 240 which may be a touch screen or using some other device which enables a player to input information into the gaming device 200.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2A. For example, not all gaming devices suitable for implementing the present disclosure, such as remote gaming devices, necessarily include top wheels, top boxes, information panels, cashless ticket systems, player tracking systems and/or an RNG. Specifically, one implementation of a remote gaming device may include processor 204, program 206, memory 208, primary game display 240, and speakers 220. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2A are examples to facilitate ease of description and explanation.

Figure 2B:
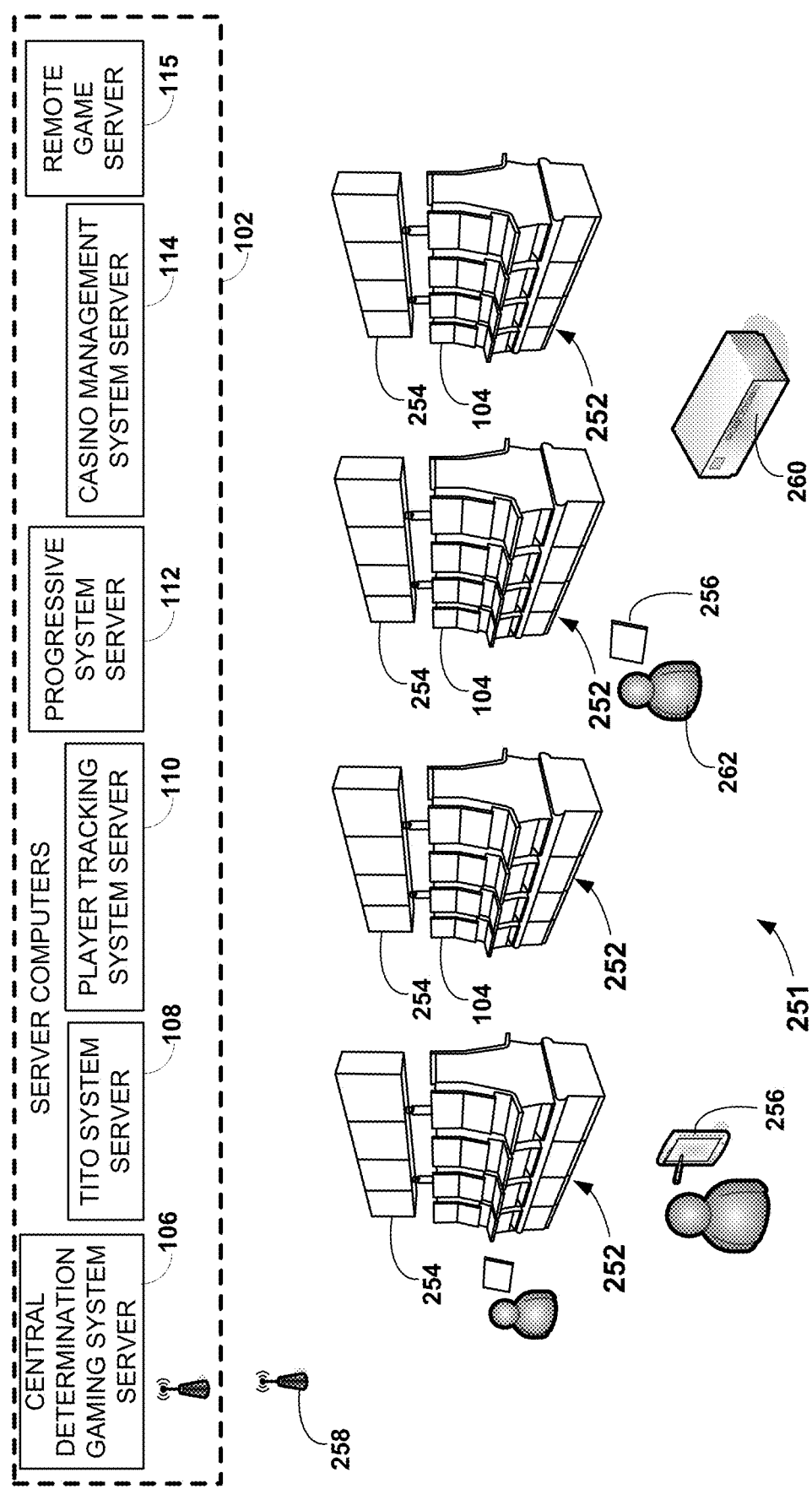
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may include tablet devices, cellular phones, smart phones, dedicated gaming consoles, and/or other handheld or portable devices. In this example, the mobile gaming devices 256 can be remote gaming devices configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, remote game server 115, and/or one of the EGMs 104 located on a casino floor. Some mobile gaming devices 256 may be configured to accept monetary credits from a credit or debit card, via a wireless interface (e.g., via a wireless payment app), via scanned checks and/or vouchers (e.g., prepaid game vouchers or TITO tickets), via a patron casino account (e.g., digital wallet), etc. As an example, to accept monetary credits, some mobile gaming devices 256 may include a camera, scanner, and/or ticket reader. In some implementations, the mobile gaming device 256 could include or be connected to a ticket printer to generate physical vouchers that can be used at EGMs 104.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via vouchers (e.g., prepaid game vouchers and TITO tickets), etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical UI (UI)) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
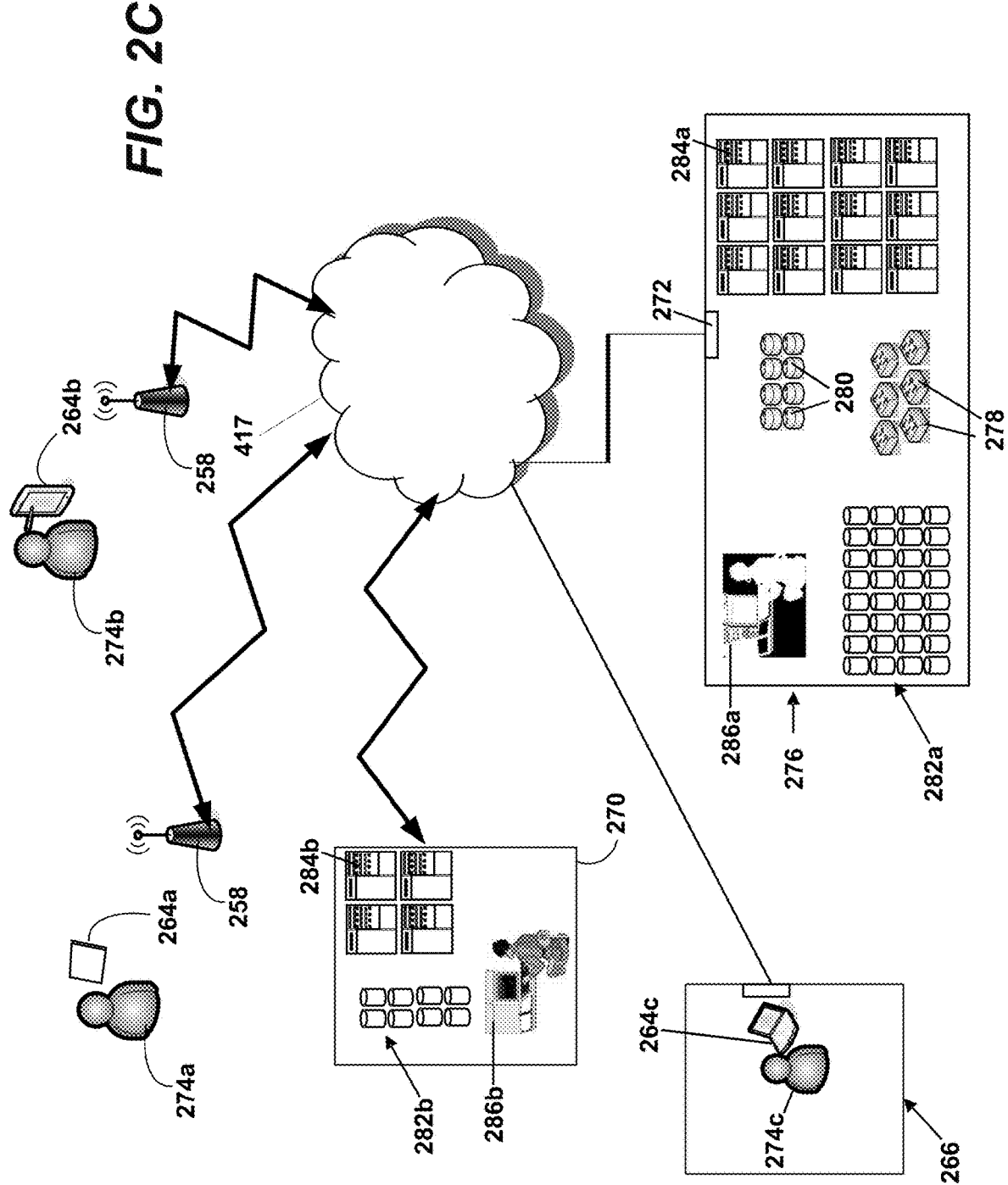
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264a, 264b and 264c, which can also be referenced throughout the disclosure as "remote gaming devices," are capable of communication via one or more networks 417. The networks 417 may, for example, include one or more cellular telephone networks, the Internet, etc. In this example, the EUDs 264a and 264b are mobile devices: according to this example the EUD 264a is a tablet device and the EUD 264b is a smart phone. In this implementation, the EUD 264c is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282a, servers 284a and one or more workstations 570a. The servers 284a may, for example, be configured to provide access to a library of games for online game play. In some examples, code for executing at least some of the games may initially be stored on one or more of the storage devices 282a. The code may be subsequently loaded onto a server 284a after selection by a player via an EUD and communication of that selection from the EUD via the networks 417. The server 284a onto which code for the selected game has been loaded may provide the game according to selections made by a player and indicated via the player's EUD. In other examples, code for executing at least some of the games may initially be stored on one or more of the servers 284a. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284b, storage devices 282b, and one or more workstations 286b. According to this example, the financial institution data center 270 is configured to maintain financial accounts, such as checking accounts, savings accounts, loan accounts, etc. In some implementations one or more of the authorized users 274a-274c may maintain at least one financial account with the financial institution that is serviced via the financial institution data center 270.

According to some implementations, the gaming data center 276 may be configured to provide online wagering games in which money may be won or lost. According to some such implementations, one or more of the servers 284a may be configured to monitor player credit balances, which may be expressed in game credits, in currency units, or in any other appropriate manner. In some implementations, the server(s) 284a may be configured to obtain financial credits from and/or provide financial credits to one or more financial institutions, according to a player's "cash in" selections, wagering game results and a player's "cash out" instructions. According to some such implementations, the server(s) 284a may be configured to electronically credit or debit the account of a player that is maintained by a financial institution, e.g., an account that is maintained via the financial institution data center 270. The server(s) 284a may, in some examples, be configured to maintain an audit record of such transactions.

In some alternative implementations, the gaming data center 276 may be configured to provide online wagering games for which game credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274a-274c), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
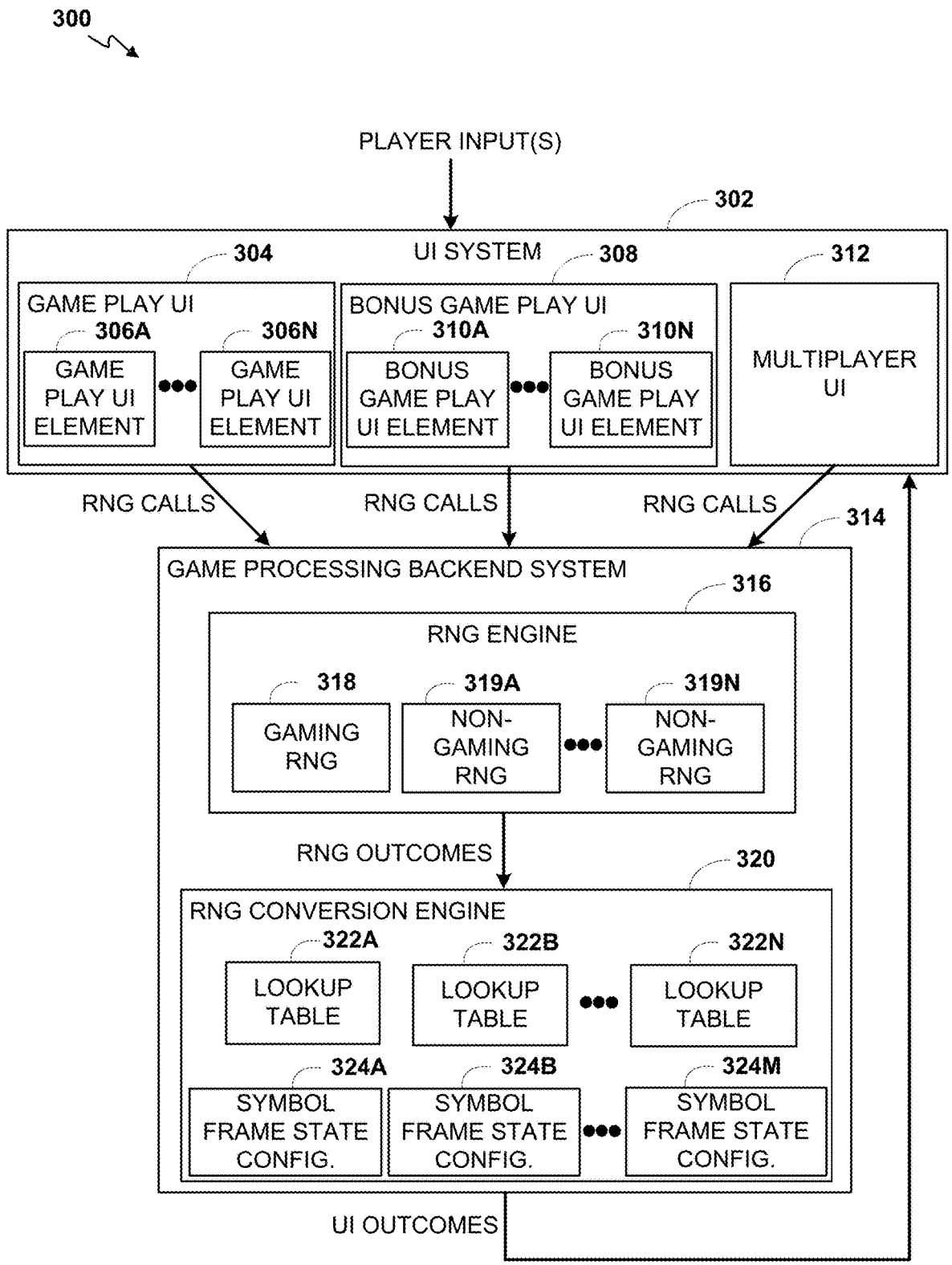
FIG. 3 illustrates, in block diagram form, an implementation of a game processing architecture that implements a game processing pipeline for the play of a game in accordance with various implementations described herein.

FIG. 3 illustrates, in block diagram form, an implementation of a game processing architecture that implements a game processing pipeline 300 for the play of a game in accordance with various implementations described herein. As shown in FIG. 3, the gaming processing pipeline 300 starts with having a UI system 302 receive one or more player inputs for the game instance. Based on the player input(s), the UI system 302 generates and sends one or more RNG and/or game initiation calls to a game processing backend system 314. Game processing backend system 314 then processes the RNG and/or game initiation calls with RNG engine 316 to generate one or more RNG outcomes, for example random numbers or a sequence listing. The RNG outcomes are then sent to the RNG conversion engine 320 to generate one or more game outcomes for the UI system 302 to display to a player. A gaming device, such as gaming devices 104A-104X and 200 shown in FIGS. 1 and 2A, respectively, can implement the game processing pipeline 300. Alternatively, portions of the game processing pipeline 300 can be implemented using a remote gaming device and one or more backend gaming systems, such as central determination gaming system server 106 and/or remote game server 115 shown in FIG. 1.

The UI system 302 includes one or more UIs that a player can interact with. Using FIG. 3 as an example, the UI system 302 includes one or more game play UIs 304, one or more bonus game play UIs 308, and one or more multiplayer UIs 312, where each UI type includes one or more mechanical UIs and/or GUIs. In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels in a reel area) are shown and/or made available to a user. In a subsequent game instance, the UI system 302 could transition out of the base game to one or more bonus game features. The bonus game play UI 308 represents a UI that utilizes bonus game play UI elements 310A-310N for a player to interact with and/or view during a bonus game feature. In one or more implementations, at least some of the game play UI element 306A-306N are similar to the bonus game play UI elements 310A-310N. In other implementations, the game play UI element 306A-306N can differ from the bonus game play UI elements 310A-310N.

In one or more implementations, the game processing pipeline 300 can incorporate the example implementations described herein into various types of reel games. In particular, a reel game includes a base reel game shown with game play UI 304 or bonus reel game shown with bonus game play UI 308. Generally, a base, or primary, reel game includes play that involves spinning reels. A bonus reel game can add the possibility of winning a relatively large payout. A bonus reel game may require an additional wager, but typically does not. For purposes of this disclosure, a bonus reel game can be a type of supplemental game feature the game processing pipeline 300 can implement.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG and/or game initiation calls to a game processing backend system 314. As an example, the UI system 302 could use one or more application programming interfaces (APIs) to generate the RNG and/or game initiation calls. To process the RNG and/or game initiation calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player.

RNG conversion engine 320 could also utilizes one or more lookup tables 322A-322N, which are also called weighted tables, to regulate a prize payout amount for each RNG outcome and how often the gaming device pays out the derived prize payout amounts. To do so, RNG conversion engine 320 can determine various game outcomes and perform operations for various types of base game features and/or supplemental game features (e.g., a bonus game feature). Although not shown in FIG. 3, the RNG conversion engine 320 could store and/or utilize one or more sets of reel strips, where each set of reel strips has different reel strip patterns. The RNG conversion engine 320 can also store (e.g., as data structures) and/or utilize one or more lookup tables 322 to assign probabilities to different options. For example, the RNG conversion engine 320 selects one of the different options based on a random number for the RNG outcome, where the different options are represented in different entries of a lookup table 322.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game feature, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline 300. In one or more implementations, instead of sending the UI outcome back to the UI system 302, the game processing backend system 314 can send information related to the UI outcome (e.g., RNG seed, the number of spins, payout amount) to the UI system 302. After receiving information related to the UI outcome, the UI system 302 may derive and determine how to present the UI outcome.

Figure 4:
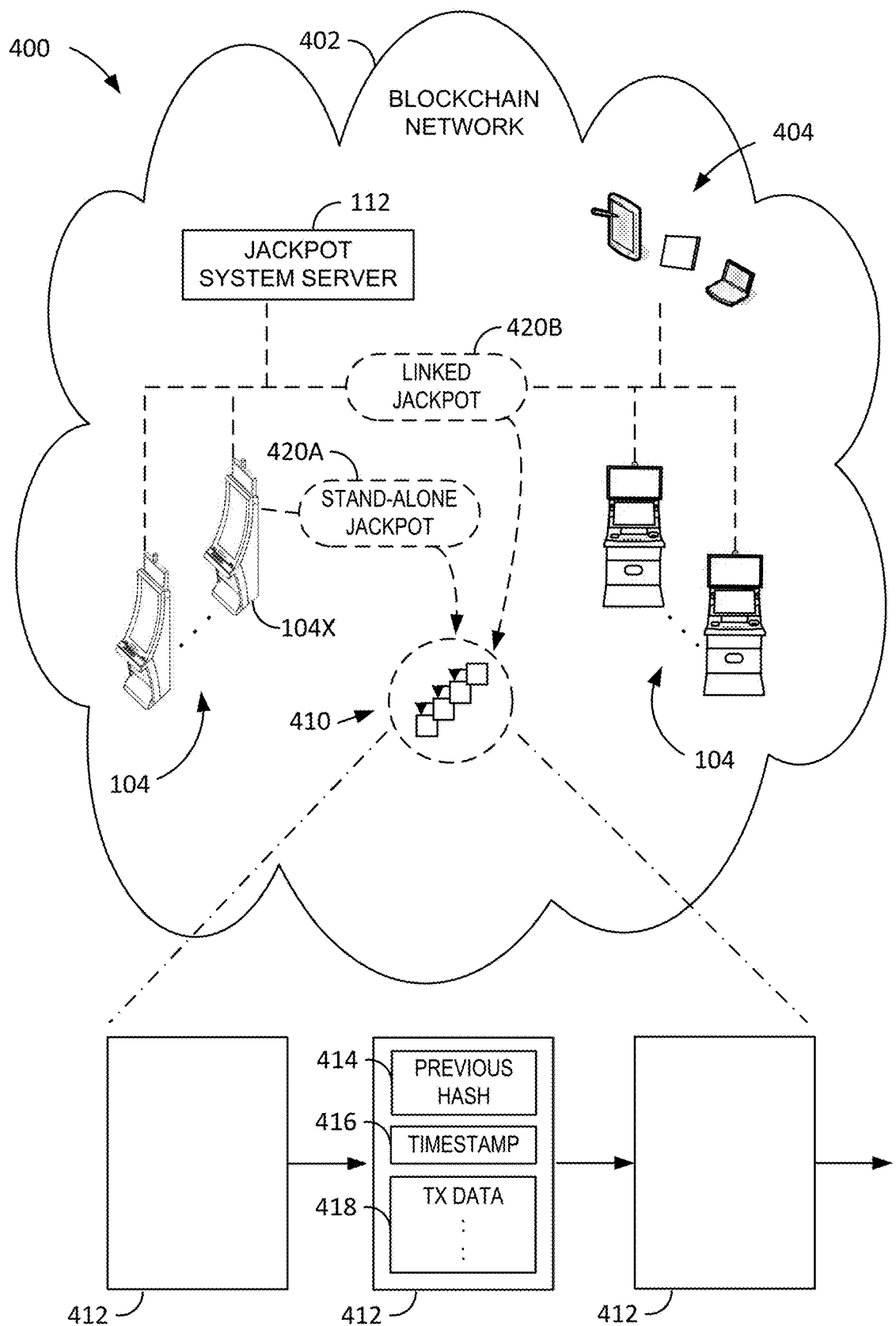
FIG. 4 is a networked environment of a jackpot blockchain system in which various devices provide jackpots to potentially be won at gaming devices using a distributed ledger (e.g., blockchain).

FIG. 4 is a networked environment of a jackpot blockchain system 400 in which various devices provide jackpots 420 to potentially be won at gaming devices 104, 404 using a distributed ledger (e.g., blockchain) 410. In the example embodiment, the system 400 includes a blockchain network 402 (e.g., a peer-to-peer ("P2P") network) in which various gaming devices 104, 404 participate in a permissioned blockchain 410 that is used to manage transactions for jackpots 420 (e.g., as progressive jackpots within a wager-based electronic gaming environment). Participating devices may include a variety of different land-based gaming devices 104 including, for example, slot machines, video poker machines, video keno machines, video slots, or other gaming devices used to participate in wager gaming. In some embodiments, participating devices may include personal devices 404 of players (e.g., mobile devices 256 shown in FIG. 2B, EUDs 264 shown in FIG. 2C). Further, some infrastructure server devices such as the jackpot system server 112 may participate in the blockchain 410. While the participating devices are coupled in networked communication through underlying networking technology not shown or described here for purposes of brevity, it should be understood that blockchain network 402 shown in FIG. 4 represents devices participating in a peer-to-peer relationship with other devices permissioned to participate in the blockchain 410, but may also include aspects of centralized communication (e.g., between gaming devices 104 and jackpot system server 112). Blockchain network 402 may include any underlying networking technologies, hardware, or protocols sufficient to enable the systems and methods described herein.

The blockchain 410 includes a linked list of blocks 412. Each block 412, in the example embodiment, includes a previous hash 414, a timestamp 416, and one or more blockchain transaction records (also referred to herein as "block transaction data," "TX DATA", or simply transactions or records) 418. As is known in the art, blockchain technology uses aspects of encryption and digital signatures to create a distributed, immutable ledger (e.g., the blockchain 410). The network 402 uses a cryptographic hash function (e.g., SHA-256, Merkle Trees, Keccak/SHA-3, or the like) to generate and memorialize a hash of the previous block as the previous hash 414. The block transaction data 418 includes a record for each transaction 418 added to a particular block 412. The blocks 412 may contain other components not expressly called out here for purposes of brevity. As is known in the art, all nodes in the network 402 execute a blockchain client that allows participation in the network 402 and maintains a copy of the blockchain 410 and may also include pending transactions received from other peer nodes prior to memorialization into a new block 412. Further, each node in the network 402 maintains a unique identity in the network 402 and may generate and use a unique public/private key pair, maintaining the private key locally and publishing the public key to other nodes in the network (e.g., for validating transactions 418 added to the blockchain 410). It should be understood that the present disclosure uses many aspects of blockchain technology (e.g., Blockchain 1.0, Blockchain 2.0 technologies) and, particularly, for permissioned blockchains and smart contracts, that are not expressly described herein for purposes of brevity.

In some embodiments, the jackpot blockchain system 400 is comprised of trusted nodes in a permissioned blockchain network (e.g., blockchain network 402) that provides no tokenization or rewards for mining, as there is no need to incentivize participation for the work contributed by the nodes. Further, the processing and energy consumption demands to nodes on the blockchain can be reduced by replacing the proof of work ("PoW") processing with other consensus mechanisms that dictate which node will add the next block to the blockchain, such as proof of stake ("PoS"), tangle, swirlds, delegated proof of stake, proof of selection, one or more delegated block generators, or the like. As such, any of the participating devices may be eligible to consolidate transactions 418 and add blocks 412 to the blockchain 410 and can avoid the processing overhead of typical proof of work consensus protocols.

Jackpots (e.g., progressive jackpots, or just "progressives") 420 are jackpot prizes that are available to potentially be won on the gaming device, typically through a rare occurrence of a particular game outcome specific to an underlying electronic game (e.g., a particular set of symbols appearing on a slot spin outcome, achieving a particular poker hand in video poker, or the like). Jackpots 420 have a jackpot value (e.g., in real currency, virtual currency, or blockchain-based currencies, also referred to herein as cryptocurrencies) that may be incremented by contributions (e.g., micro-transactions) from participating devices (e.g., taking a small fraction of a wager amount during each round of play at that gaming device), and thus the jackpots 420 may grow over time. Some jackpots 420 may have predefined minimum or maximum values. In the example embodiment, the jackpot blockchain system 400 supports progressive jackpots 420 of two types: stand-alone progressive ("SAP") jackpots 420A and linked progressive jackpots (or just "linked progressives" or "wide area progressives (WAPs)") 420B. SAP jackpots 420A are progressive jackpots that are available to be won only at a specific gaming device 104X. SAP jackpots 420A receive contributions from the local device, and may receive contributions from an infrastructure server such as the jackpot system server 112 (e.g., as a minimum reset amount after a jackpot win). Linked jackpots 420B are shared amongst multiple gaming devices 104, 404. Linked jackpots 420B are available to be won on those multiple gaming devices 104, 404, and also may receive contributions from any or all of those same gaming devices 104, 404 or the jackpot system server 112. Some linked jackpots 420B may be local area progressives ("LAPs"), in which multiple devices at a single location (e.g., a single casino property, gaming venue, or such) participate in the linked jackpots 420B. Other linked jackpots 420B may be wide area progressives ("WAPs"), in which devices from multiple locations (e.g., multiple properties, disparate geographies, or such), or even personal computing devices 404 of players, participate in the linked jackpot 420B. The term "progressive group" may be used herein to identify the group of gaming devices 104, 404 that participate in a particular linked jackpot 420B. While only one SAP jackpot 420A and one linked jackpot 420B is shown here, it should be understood that each gaming device 104, 404 may offer any number of SAP jackpots 420A or participate in any number of linked jackpots 420B, and the jackpot blockchain system 400 may support any or all of such jackpots 420.

In the example embodiment, the blockchain 410 is configured with an account for each unique jackpot 420 managed by the blockchain 410. Each "jackpot account" has a unique account identifier (ID) associated with that jackpot 420. The jackpot accounts are used to manage the value of the jackpots 420 through time. For example, when introducing and configuring a new jackpot 420 to the system 400, the jackpot system server 112 (or local gaming device 104) may create and configure a new account within the blockchain 410 (e.g., as an account creation message to the blockchain 410). In some embodiments, the blockchain 410 may also be configured with progressive escrow accounts that can receive escrow deposit and escrow withdrawal transactions (e.g., moving credit between escrow accounts and associated progressive accounts on the blockchain 410).

In the example embodiment, the participating devices (also referred to herein as "nodes") of the network 402 perform progressive blockchain transactions 418 and track jackpot data (e.g., current jackpot totals) through the blockchain 410. One example jackpot blockchain transaction 418 performed in the blockchain 410 is a "jackpot deposit transaction" (or just "deposit transaction"). Deposit transactions 418 are transactions 418 that add value to a jackpot account, representing an incremental addition to that account. During operation, the gaming devices 104 perform deposit transactions 418 into the blockchain 410 for each game play round (e.g., as a fractional portion of a primary wager). Each deposit transaction 418 added to the blockchain 410 includes a jackpot account ID, an increment amount, and a transaction type ID indicating that this transaction 418 is a deposit type transaction. In some embodiments, no transaction type is used for deposit or withdrawal transactions, but a positive increment amount may be used to indicate a deposit type transaction and a negative increment amount may be used to indicate a withdrawal type transaction. In some embodiments, deposit transactions 418 may include a source device ID of the contributing device, a game round identifier associated with the round of play at the contributing device, a player ID of the player active at the contributing device at the time of the game round, or a timestamp of the game round. In some embodiments, a submitting gaming device 104X may participate simultaneously in multiple jackpots and, as such, may contribute an amount to each of those jackpots 420 for each game round. The submitting device 104X performs a separate deposit transaction 418 into the blockchain 410 for each individual jackpot 420, using different jackpot account IDs for each separate contribution. In some embodiments, a single deposit transaction 418 may identify multiple jackpot account IDs, and may include different increment amounts for each identified jackpot account ID, thereby allowing multiple deposits to be aggregated into a single transaction record within the blockchain 410.

Another example jackpot blockchain transaction 418 performed in the blockchain 410 is a "jackpot withdrawal transaction" (or just "withdrawal transaction"). Withdrawal transactions 418 are performed when a participating gaming device 104 wins a particular jackpot (referred to herein as the "winning gaming device" and the "subject jackpot"). During operation, in the example embodiment, once a jackpot win has been achieved at the winning gaming device 104, 404, the winning gaming device 104, 404 captures a timestamp at the time of the win ("win timestamp") and determines a current total jackpot value of the subject jackpot. In one embodiment, the winning gaming device 104, 404 searches the blockchain 410 for all deposit transactions 418 made to the account ID of the subject jackpot (or just "subject account") since the time of the last win (e.g., since the last withdrawal transaction associated with a win event). The winning gaming device 104, 404 adds up all of the identified deposit transactions 418 to determine the total jackpot value. In another embodiment, the winning gaming device 104, 404 may transmit a jackpot win message (e.g., an off-blockchain network message) to the jackpot system server 112 indicating that the subject jackpot has been won at the winning gaming device 104, 404 (e.g., identifying device ID of the winning gaming device 104, 404, the timestamp of the win time, and the jackpot account ID of the subject jackpot). Upon receipt of the jackpot win message, the jackpot system server 112 may search the blockchain 410 for the deposit transactions 418 of that progressive jackpot and determine the total jackpot value.

Once the total jackpot value is determined, the jackpot blockchain system 400 causes that jackpot to be awarded to the player (e.g., crediting the player's balance at the gaming device 104, 404 with the total jackpot value, summoning service personnel for a hand pay, crediting a player account with the total jackpot value, or the like). Further, the winning gaming device 104, 404 also creates and transmits a withdrawal transaction 418 into the blockchain 410. The withdrawal transaction 418 includes the jackpot account ID, the total jackpot value awarded during this win (e.g., and subsequently reduced from the jackpot account ID), the win timestamp, and a transaction type ID indicating that this transaction 418 is a win withdrawal type transaction. The withdrawal transaction 418 may include other win information, such as the device ID of the winning gaming device 104, 404, a player ID of the winning player, a method of payment performed for this win event, or such.

In some embodiments, some progressive jackpot accounts in the blockchain 410 may be "owned" and controlled by a designated device (e.g., as the account holder of the blockchain account for that jackpot). For example, SAP jackpots 420A may be controlled by the associated gaming device 104. For linked jackpots 420B, a central device (e.g., jackpot system server 112) may be the designated owner. In such embodiments, deposit transactions to the owned jackpots 420 may be made by other nodes, but withdrawal transactions from that account may be restricted to only the controlling device. Upon a jackpot win, the controlling device may receive an indication of a win event from another device, and the controlling device performs the withdrawal transaction, removing the win amount from the jackpot account in the blockchain and transmitting a message to the winning device to credit the win amount to the player.

In some embodiments, the jackpot blockchain system 400 may facilitate other blockchain uses for the blockchain 410 and participating devices. In other words, the blockchain 410 may support other types of blockchain transactions 418 unrelated to progressive jackpots 420.

In the example embodiment, any node in the blockchain 410 (e.g., gaming devices 104, 404, jackpot system server 112) may participate in creation of blocks 412 (e.g., as miner nodes).

Figure 5:
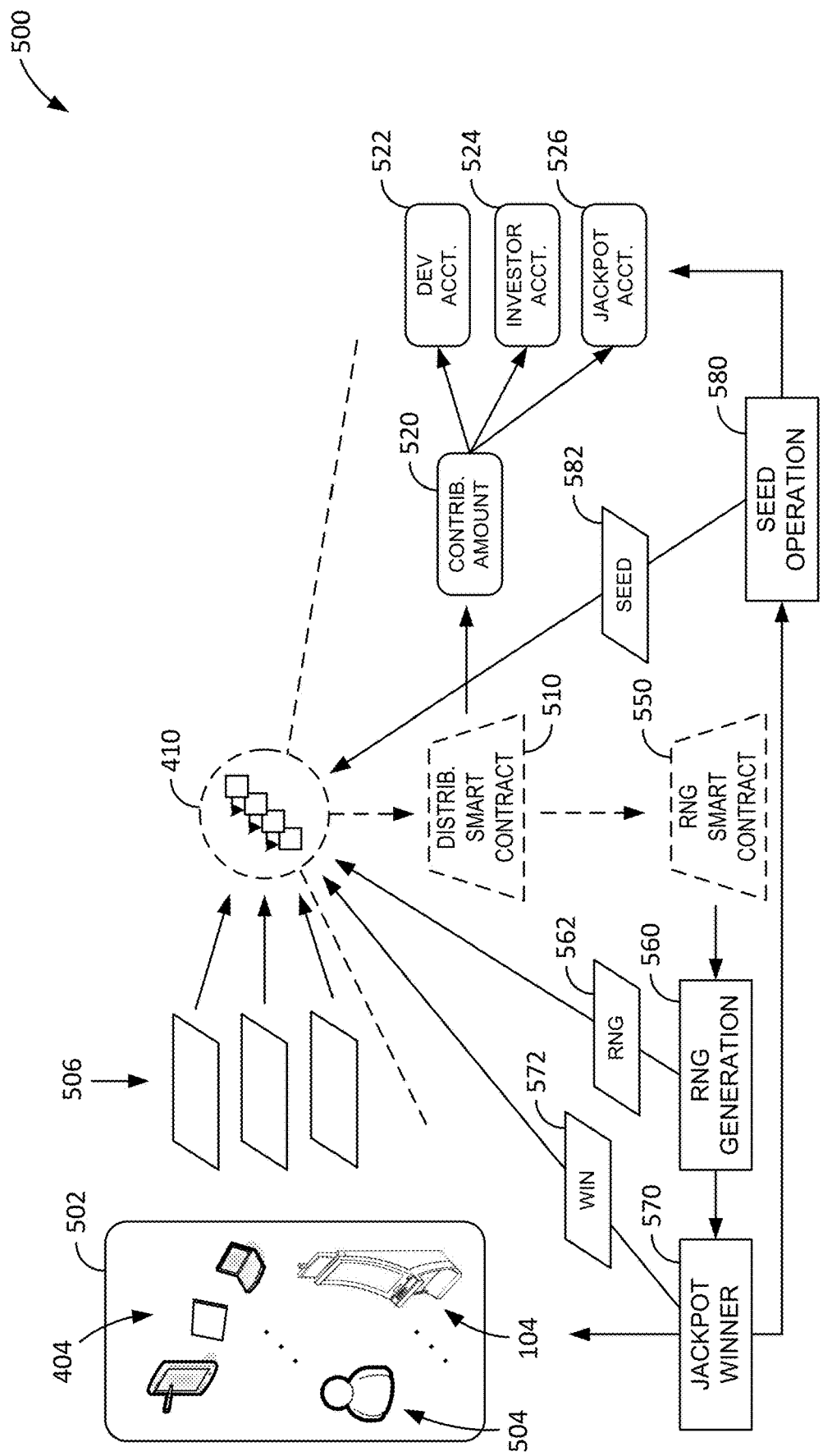
FIG. 5 is a data flow diagram that illustrates an example embodiment in which a jackpot blockchain system provides jackpot services.

FIG. 5 is a data flow diagram that illustrates an example embodiment in which a jackpot blockchain system 500 provides jackpot services. The jackpot blockchain system 500 may be similar to the jackpot blockchain system 400 shown in FIG. 4, and vice versa. In the example embodiment, various participating devices 502 participate as nodes, and perhaps miner nodes, in the blockchain 410. Like the jackpot blockchain system 400 shown in FIG. 4, the participating devices 502 may include gaming devices 104 (e.g., fixed, land-based EGMs installed in wagering venues), personal computing devices 404 of players (or "patrons") 504, jackpot system server 112 (shown in FIG. 4), or the remote game server 115. In this example, the jackpot blockchain system 500 is a permissioned or private blockchain in which participation is controlled by one or more parties to the blockchain 410 (e.g., a casino operator, a game device manufacturer, a regulatory body, or the like).

In the example embodiment, the participating devices 502 also participate in one or more jackpots (e.g., progressive jackpots). During operation, and as the players 504 play electronic games on the participating devices 502, the participating devices 502 submit blockchain transactions (or just "transactions") 506 into the blockchain 410. In some embodiments, some of these transactions 506 are performed for each play of the electronic game (e.g., each wager and spin of a slot-style game, each hand of video poker, or the like). Participation in jackpots may include contributing a portion of a wager amount to one or more jackpots. Each jackpot supported by the jackpot blockchain system 500 may have an associated unique account on the blockchain 410 into which funds may be added and withdrawn. For example, some participating devices 502 may provide one or more stand-alone jackpots 420A to which only they, or support servers, contribute (e.g., mini, minor, and major jackpots or the like), and may also participate in one or more linked jackpots 420B to which multiple participating devices 502 also contribute (e.g., grand jackpot or the like). The blockchain 410 may permission personal computing devices 404 to participate in the blockchain 410 directly, or may facilitate participation in the blockchain 410 indirectly by, for example, channeling transactions 506 through an intermediary that directly participates in the blockchain 410, such as the jackpot system server 112, the remote game server 115, or the like.

During each play of the electronic games, the participating device 502 transmits a transaction 506 (e.g., a "jackpot contribution transaction") into the blockchain 410. The jackpot contribution transaction may include a transaction type (e.g., indicating a jackpot contribution), a total wager amount and/or a contribution amount (e.g., how much the player 504 wagered during this play of the electronic game or a portion of the total wager amount that is to be contributed to the jackpot(s)), and one or more unique jackpot identifiers (e.g., identifying which jackpot(s) the contribution amount is to be applied). In the example embodiment, the blockchain 410 includes a distribution smart contract 510 that executes on each jackpot contribution transaction entering the blockchain 410. The distribution smart contract 510 is configured to apportion a total contribution amount 520 into one or more accounts within the blockchain 410. In this example, the blockchain 410 includes a developer account 522, an investor account 524, and a jackpot account 526. The developer account 522 is associated with a game developer, gaming machine manufacturer, an operator, or the like. The investor account 524 is an account that may be disbursed to investors in the blockchain 410, such as operators, miners, or capital investors. The jackpot account 526 is an account configured to hold the bulk of funds contributed by these jackpot contribution transactions and as the source of paying jackpot wins (e.g., when a winning player achieves a jackpot win condition in their game play). The distribution smart contract 510 may be configured with a fixed percentage for the developer account 522 (e.g., 8% to developers for marketing, development, infrastructure, or the like) and a fixed percentage for the investor account 524 (e.g., 2% to investors). During execution of the distribution smart contract 510, the smart contract 510 apportions the total contribution amount 520 to each of the accounts 522, 524 based on each defined percentage, and applies the remainder of the contribution amount 520 (e.g., 100%-8%-2%=90%) to the jackpot account 526.

In the example embodiment, the blockchain 410 also includes an RNG smart contract 550. In typical conventional progressives, jackpot win determinations may be performed by the gaming device (e.g., by the EGM 104) or by a centralized determination system (e.g., central determination gaming system server 106), and typically using an RNG value and a pay table that includes both jackpot win conditions and other outcomes that include win or loss conditions. Here, the RNG smart contract 550 performs jackpot win determination. More specifically, in the example embodiment, upon receiving a jackpot contribution transaction, the RNG smart contract 550 generates a jackpot RNG value at operation 560. The RNG smart contract 550 may store the RNG value and other data associated with this RNG generation back into the smart contract 410 (e.g., as an RNG transaction 562). In some embodiments, the RNG value determination may be seeded with data from the blockchain 410 (e.g., from prior transaction data 418, timestamp data 416, or hash data 414 in prior blocks 412 in the blockchain 410). The RNG smart contract 500 also performs an RNG win determination based on the RNG value at operation 570. To determine whether or not this game play is awarded a particular jackpot, the RNG smart contract 550 includes and identifies a pay table that may be associated with the participating device 502, the particular jackpot(s) with which the device 502 participates, or a particular game title being played by the participating device 502. The RNG smart contract 550 compares that RNG value to the pay table(s) associated with the particular jackpots and determines whether or not this game play is awarded a jackpot.

When a jackpot win is determined by the RNG smart contract 550, the RNG smart contract 550 transmits a win notification back to the winning device 502 and automatically transfers a win amount to an account on the blockchain associated with the player 502 or with the winning device 502. To credit the appropriate account on the blockchain 410, the RNG smart contract 550 may transmit a win transaction 572 back into the blockchain 410 or otherwise perform a transaction that transfers the win amount from the jackpot account 526 associated with the won jackpot to the target account on the blockchain 410. The win amount may be the current total value associated with that jackpot account 526 within the blockchain 410 or some partial amount (e.g., a predetermined percentage, the total amount less a seed value, or such). In some embodiments, the RNG smart contract 550 may additionally execute a seed operation 580 that moves a predetermined value (e.g., as a seed transaction 582) from, for example, an escrow account (not shown) into the jackpot account 526 (e.g., to seed the jackpot account 526 with a minimum amount after payout of the win amount). As such, the blockchain 410 determines jackpot winners and automatically performs the transactions necessary to both credit the appropriate account of the winner and to memorialize the outcome determinations for each jackpot determination (e.g., wins only, or both wins and losses). In some embodiments, the winning player 504 may have an account on the blockchain 410 into which the win amount is credited. In other embodiments, the winning device 502 may have an account on the blockchain 410 into which the amount is credited, and the winning player 504 may subsequently be credited with that amount (e.g., via a credit meter and payout on the device 502, via a cash out transaction to a digital wallet of the player 504, or the like).

While the example blockchain 410 is described herein as a permissioned blockchain, in other embodiments, the blockchain 410 may be provided as a permissionless or public blockchain, a consortium or hybrid blockchain, or a private blockchain. Such a permissionless or hybrid blockchain embodiments may use, for example, restrictive access smart contracts for access control to the smart contract code. The system 500 may, for example, use an operator or vendor-approved digital wallet or client account (e.g., via a player app or client app provided on the devices 404) and may add a custom token, non-fungible token, or signed transaction to the wallet or client's history. The smart contracts may blacklist users based on information on the blockchain 410, as the blockchain or smart contract could check for the custom data that each wallet would be required to have to interact with the smart contract (e.g., preventing a random person from connection via a Web 3.0 API without being a verified user).

Figure 6:
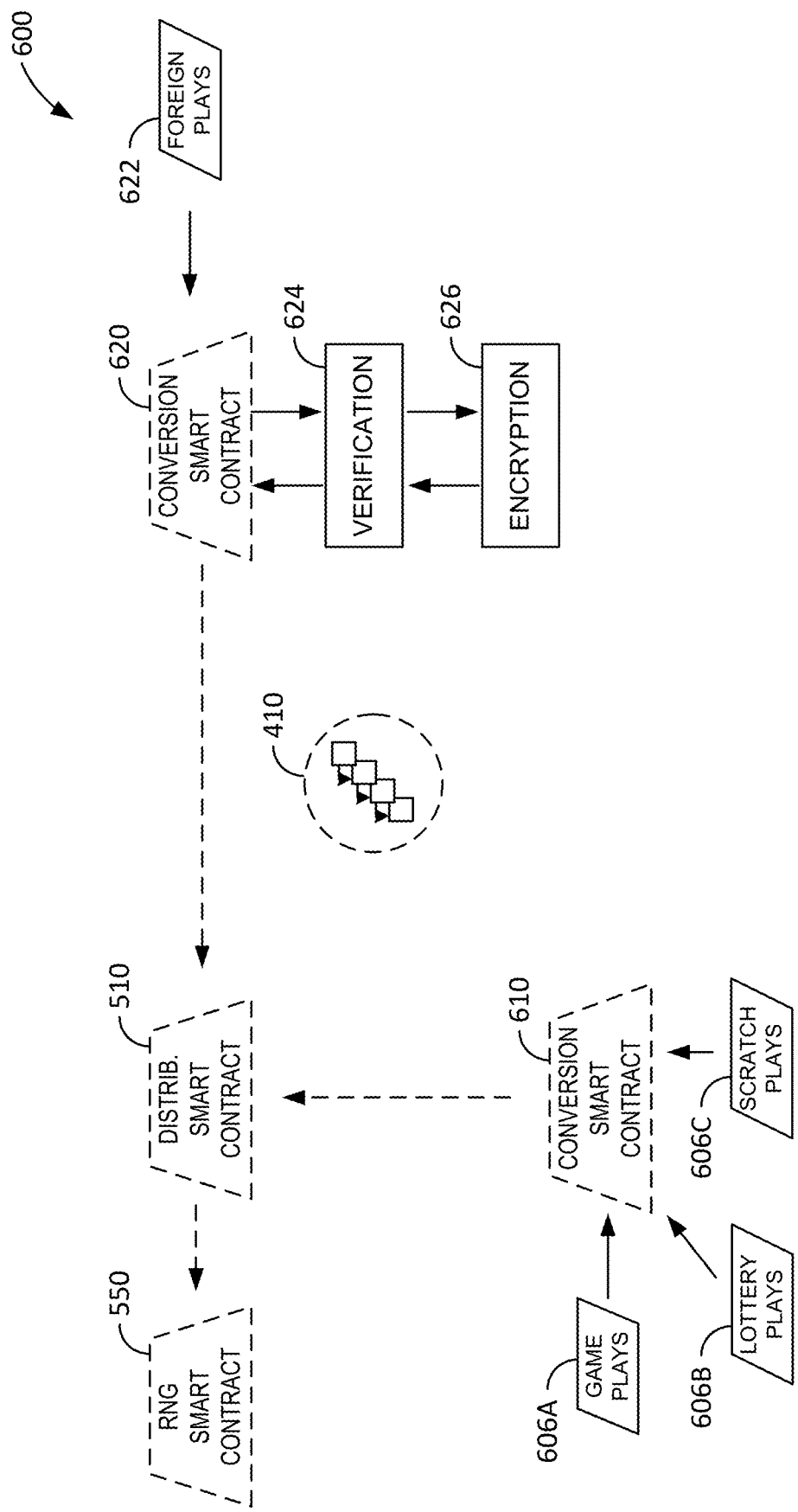
FIG. 6 is a data flow diagram of another example embodiment in which a jackpot blockchain system provides jackpot services.

FIG. 6 is a data flow diagram of another example embodiment in which a jackpot blockchain system 600 provides jackpot services. The jackpot blockchain system 600 may be similar to the jackpot blockchain systems 400, 500 shown in FIG. 4 and FIG. 5, respectively, and vice versa. In the example embodiment, the jackpot blockchain system 600 allows participation in linked jackpots from various games or game sources. For example, the jackpot blockchain system 600 may allow the gaming devices 502 to participate in a particular linked jackpot 420B provided by blockchain 410 (e.g., per wager from electronic games provided by the gaming devices 502, such as slot-style games, video poker style games, keno games, or the like), represented in FIG. 6 as game plays transactions 606A. Further, the jackpot blockchain system 600 may also allow video lottery play devices to participate in the same linked jackpot 420B (e.g., per lottery ticket, virtual lottery ticket, or lottery-based play purchased from lottery devices, not separately shown), represented in FIG. 6 as lottery plays 606B. In addition, the jackpot blockchain system 600 may further allow video scratch-off-based play devices to participate in the same linked jackpot 420B (e.g., per scratch-off ticket, virtual scratch-off ticket, or scratch-off-based play purchased from scratch-off devices, not separately shown), represented in FIG. 6 as scratch plays 606. Game plays 606A, lottery plays 606B, and scratch plays 606C may be collectively referred to herein as "plays 606" or "play transactions 606," each of which may be similar to the jackpot contribution transactions 506 shown in FIG. 5. In embodiments with physical lottery plays 606B and physical scratch plays 606C, the physical lottery ticket or scratch-off card may include a scannable code (e.g., QR code) that can be scanned and submitted to the jackpot blockchain system 600, which causes the lottery play 606B or scratch play 606C to be submitted to the system 600 for a potential jackpot win.

In some embodiments, point-of-sale (POS) devices (not separately shown) may participate in the jackpot blockchain system 600. For example, during a sales transaction, the consumer may elect to provide an additional purchase amount for participation in the jackpot 420 (e.g., a fixed amount, or round up to the nearest dollar amount). This additional purchase amount may similarly be submitted by the POS device as the contribution amount for participation in, and a chance to win, the jackpot 420.

In the example embodiment, play transactions 606 submitted into the blockchain 410 may trigger execution of a conversion smart contract 610. The conversion smart contract 610 is configured to collect the contribution amount from the play transactions 606, which is provided in a "source currency" (e.g., U.S. dollars or other fiat currency) and convert some or all of the contribution amount into a virtual currency (e.g., a cryptocurrency). For example, the jackpot blockchain system 600 may provide a private cryptocurrency and may convert a source currency amount of the initial source contribution into the private cryptocurrency (e.g., via a predefined or dynamic conversion ratio). As such, upon execution of the distribution smart contract, the jackpot account 526 may be maintained in the private cryptocurrency rather than a value of fiat currency. Similarly, each play 606 may also cause execution of the RNG smart contract 550 for win determination, as described above with respect to FIG. 5.

The jackpot blockchain system 600 may also provide foreign play participation in the same linked jackpot 420B. For example, the blockchain 410 may receive foreign plays 622 from foreign sources, such as lottery or electronic game plays from non-U.S. jurisdiction sources (e.g., a gaming device from Japan participating in the jackpot blockchain system 600). The blockchain 410 also provides a conversion smart contract 620 which converts a foreign currency contribution amount into the private cryptocurrency in which the jackpot 420B is being provided. Further, foreign plays 622 may undergo additional processing and verification (e.g., to comply with local laws). Here, the conversion smart contract 620 performs a verification process 624 and an encryption process 626 to ensure compliance with local laws (e.g., AML/KYC laws) before continuing on to the distribution smart contract 510 and RNG smart contract 550.

In an example embodiment, some SAP jackpots 420A or linked jackpots 420B may be provided in a digital asset rather than a fiat currency. For example, a particular linked jackpot 420B may be provided in Bitcoin. In such embodiments, the conversion smart contract 610 may perform conversion of the contribution amount of plays 606 from a fiat currency provided as the wager, and as the initial contribution amount to the jackpot, into the target cryptocurrency (e.g., into Bitcoin). The conversion smart contract 610 may use a fixed or dynamic conversion ratio when performing the conversion into the target cryptocurrency (e.g., a floating ratio reflective of current market conversion rates between the source fiat currency and the target cryptocurrency). As such, a resulting win of the linked jackpot 420B may result in transfer of a win value in the target cryptocurrency rather than a fiat currency. Such an award may provide additional incentive or excitement to players, as they are digital assets that may fluctuate more than fiat currencies and may help introduce players to ownership of digital assets. In some embodiments, the conversion smart contract 610, 620 may perform a reverse conversion of the private cryptocurrency or the public cryptocurrency back into a fiat currency. Since some public cryptocurrencies may fluctuate more than fiat currencies, jackpots based on such public cryptocurrencies or other assets that build over longer times may allow those underlying assets to appreciate during the time between jackpot wins, and thus may cause the jackpot win amounts to appreciate.

In some embodiments, some jackpots 420 may be provided in tangible assets or investment assets, such as in gold, a gold backed asset (e.g., gold PAX), a gold backed cryptocurrency, or investment assets such as stocks or bonds. For example, the blockchain 410 may track a particular jackpot 420 in gold value, converting any contribution amounts into equivalent gold value (e.g., based on current gold exchange rates, per unit weight), and tracking that jackpot 420 in gold value. As such, when a player wins that jackpot, the jackpot blockchain system 600 may generate and transfer a digital asset (e.g., as a non-fungible or partially fungible token) to the player that is redeemable for a weight in gold.

Figure 7:
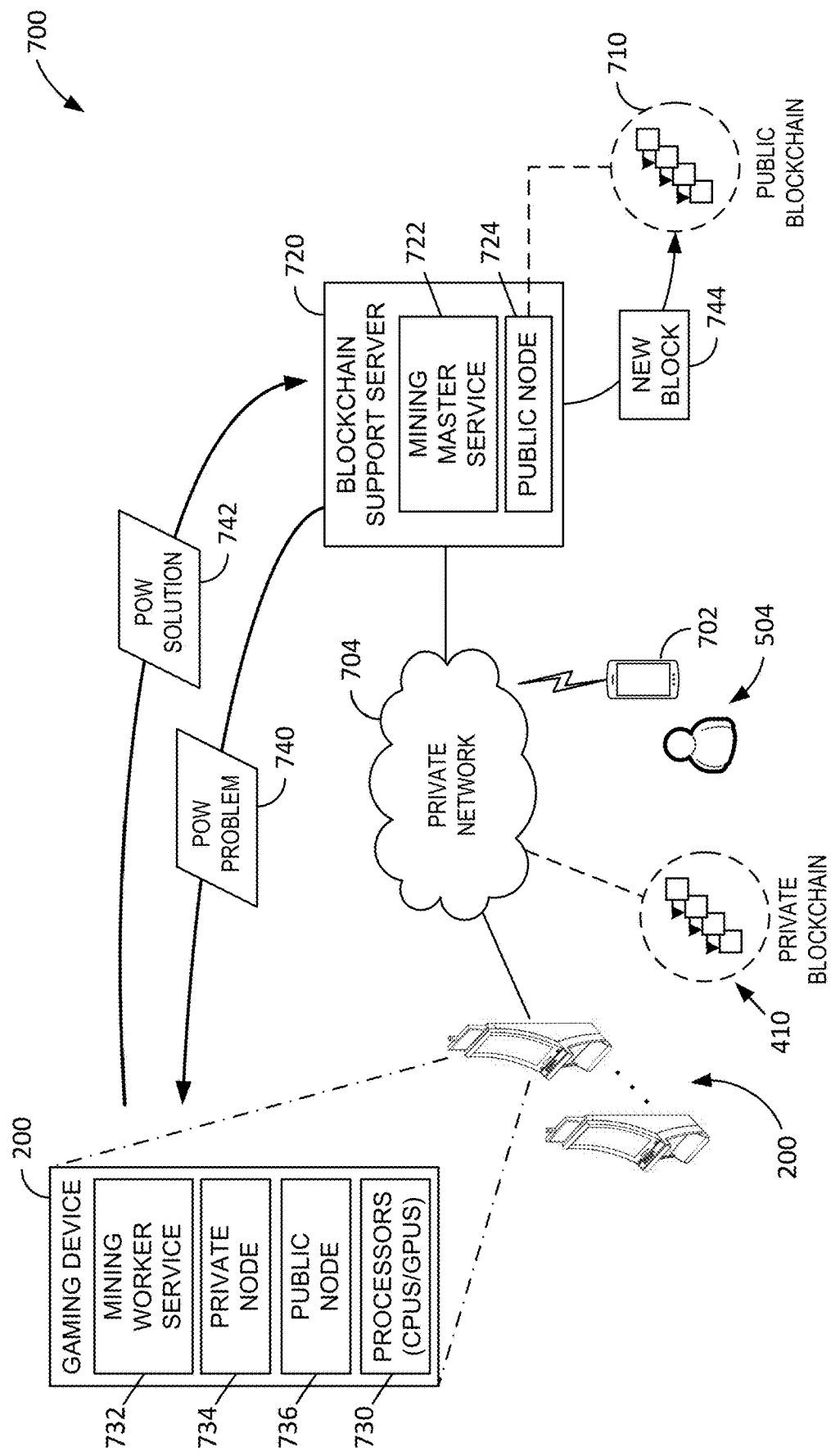
FIG. 7 is a diagram of a blockchain system for integrating various blockchain services with gaming devices.

FIG. 7 is a diagram of a blockchain system 700 for integrating various blockchain services with gaming devices 104, 200. Gaming devices can see variable use through their operational lifecycles. For example, even when deployed in an active gaming venue, a typical gaming device may spend a significant percentage of time in an idle state (e.g., not engaged in player gaming). During these idle periods, the gaming devices are typically configured to enter an "attraction mode," where the display device(s) show example game play, rules, advertisements, or other such content (e.g., in an effort to attract players to play on that gaming device). However, during these idle periods, the gaming devices may not be generating any revenue for the operator or otherwise providing productive output.

In the example embodiment, the blockchain system 700 utilizes gaming devices 200 to perform blockchain processing (e.g., proof of work ("PoW") computations) that can generate revenue on a blockchain, such as public blockchain 710 (e.g., Bitcoin or the like). Gaming devices 200 include computational hardware (e.g., central processing units ("CPUs"), graphics processing units ("GPUs")) that can be leveraged to perform computational workloads other than the gaming services typically provided by such devices. Here, the blockchain system 700 utilizes the gaming devices 200 to perform blockchain PoW computations, a process commonly referred to as "blockchain mining" or "cryptocurrency mining." This blockchain mining utilizes existing, idle hardware and computational cycles of the gaming devices 200 to generate revenue that can be used, for example, to enhance the value of progressive jackpots (e.g., adding the cryptocurrency revenues to a jackpot) or to subsidize the operational expenses of the gaming devices 200.

Two types of architectures are described herein that can leverage the processing power of the gaming devices 200 to perform PoW computations (sometimes referred to as "computational puzzles" or "cryptographic proof"). In one embodiment, referred to herein as a "master/worker architecture," or an "indirect" or "distributed" architecture, a blockchain support server 720 participates in the public blockchain 710 (e.g., as a mining node) and the server 720 utilizes the gaming devices 200 as computational engines for performing PoW computations on behalf of the server 720. FIG. 7 illustrates this master/worker, distributed architecture. In another embodiment, referred to herein as a "direct architecture," each gaming device 200 directly participates in the public blockchain 710 as a miner node. Each of these embodiments is described in greater detail below.

In the example master/worker architecture of FIG. 7, the blockchain support server 720 participates in the public blockchain 710 via a public node 724 component (e.g., the blockchain software client used to participate in the public blockchain 710). The server 720 acts as a mining node in the public blockchain 710, competing periodically to append blocks to the public blockchain 710 and, coincidentally, receiving awards (e.g., block rewards) for this service when winning the competition (e.g., where the award may be in the form of cryptocurrency on the blockchain 710). While not shown in FIG. 7, it should be understood that the blockchain support server 720 includes computing hardware such as would enable the systems and methods described herein, and may include one or more CPUs, GPUs, volatile and non-volatile memory, network interface cards, and the like.

The blockchain support server 720 may perform PoW computational processing in furtherance of the periodic PoW competitions (e.g., proof of work consensus) on the public blockchain 710. In addition, the blockchain support server 720 also includes a mining master service 722 that is configured to utilize the computational power of the gaming devices 200 to help with the PoW competitions. More specifically, the mining master service 722 dispatches computational processing activities to some or all of the gaming devices 200 during a given round of competition (e.g., when a new block is to be added to the blockchain 710) and any of the participating gaming devices 200 contribute computational effort by attempting to successfully complete the PoW computation.

More specifically, in the example embodiment, gaming devices 200 include a mining worker service 732 that communicates with the blockchain support server 720 via a private network 704. The mining worker service 732 is configured to receive a PoW problem message 740 from the mining master service 722 and attempt to solve the PoW problem 740. The PoW problem 740 identifies various computational components that are defined and known on the public blockchain 710 for a particular round of competition (e.g., for a particular new block). When a gaming device 200 finds a solution to the PoW problem 740, that gaming device transmits a PoW solution message 742 back to the blockchain support server 720 and the blockchain support server 720 adds a new block 744 to the blockchain 710.

Figure 8:
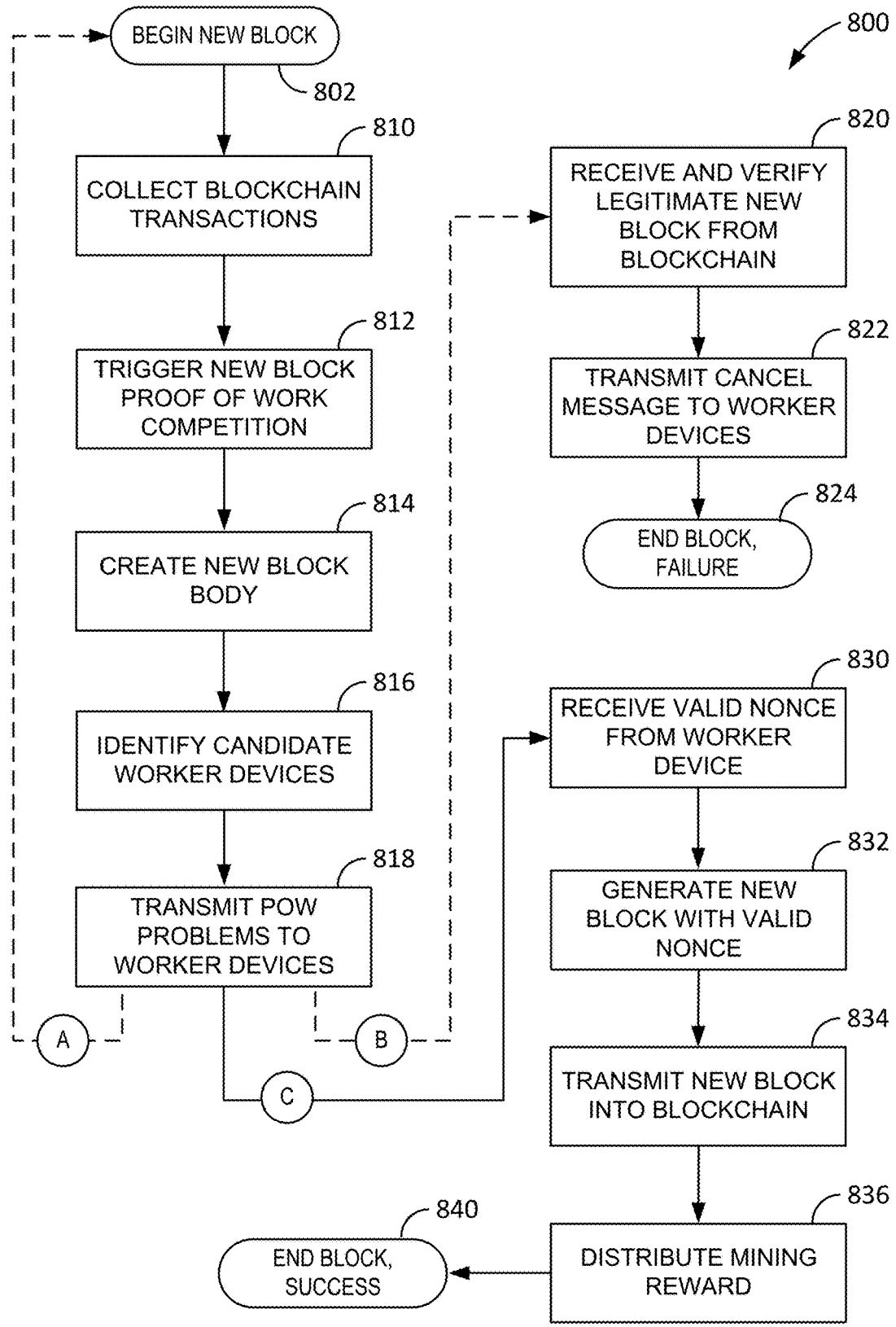
FIG. 8 is a flow chart illustrating an example method for providing distributed computing to solve the PoW problem using the gaming devices of FIG. 7.

FIG. 8 is a flow chart illustrating an example method 800 for providing distributed computing to solve the PoW problem 740 using the gaming devices 200 of FIG. 7. In some embodiments, the method 800 is performed by the mining master service 722 of the blockchain support server 720. In the example embodiment, each new block begins 802 with the blockchain support server 720 listening for and collecting new blockchain transactions on the blockchain 710 at operation 810. These transactions are broadcast to the various nodes on the blockchain 710 as they occur. At operation 812, a new block proof of work competition is triggered (e.g., when a number of new transactions exceeds a predetermined threshold). This competition trigger may be initiated by the server 720 based on conditions defined by the particular protocol used by the blockchain 710, or the like.

At operation 814, the server 720 creates a new block body that will be used in the PoW computations. In the example embodiment, the public blockchain 710 defines a consensus protocol and, particularly, a proof of work algorithm or process that is performed by miner nodes on that blockchain 710 to determine consensus for which node gets to add the next block to the blockchain 710. In one embodiment, the blockchain 710 is similar to the Bitcoin blockchain, which uses a hashing algorithm (e.g., SHA-256) as the consensus algorithm. More specifically, when a miner node on the blockchain 710 competes to add a new block to the blockchain 710, the miner node identifies a new block body (e.g., a byte string that includes a new set of transactions, as well as perhaps other components such as previous hash, a timestamp, or the like) and begins randomly applying (e.g., appending) nonce strings onto the new block body and hashing the result (e.g., in 256 bits under SHA-256) until a nonce string is found that causes the result to be below a given threshold value. In the example embodiment, this new block body is included in the PoW problem message 740, as it will be used during the PoW computations.

At operation 816, the blockchain support server 720 identifies a list of candidate worker devices 200 to participate in this round of PoW competition. In some embodiments, the blockchain support server 720 may maintain activity status of gaming devices 200 and may identify only those gaming devices that are currently idle (e.g., not actively providing player gaming). At operation 818, the server 720 transmits PoW problem messages 740 to the identified worker devices 200. The PoW problem messages 740 include the new block body (e.g., as a string of data) and may include other data such as, for example, a beginning nonce seed value (e.g., a randomly determined string such that other devices 200 are unlikely to overlap and duplicate work).

On any particular gaming device 200, the mining worker service 732 receives the PoW problem message 740 and parses the message contents to identify at least the block body and perhaps a beginning nonce seed. In some embodiments, the gaming device 200 may randomly determine a nonce seed. The gaming device 200 may determine whether or not to participate in the current round of PoW competition based on, for example, the current activity state of the device 200. For example, if the gaming device 200 is actively involved in player gaming, if the device 200 is being actively serviced (e.g., by a technician), or is within a maintenance window or engaged in a maintenance activity (e.g., performing a software load or backup operation), then the gaming device 200 may elect not to participate in this round of PoW competition. Otherwise, the gaming device 200 begins PoW computations. These computations, in the example embodiment, include concatenating the current nonce value (string) to the end of the block body (string), hashing the combined string to generate a resultant hash value, then comparing that hash value to a threshold value to determine whether or not the hash value is below the threshold value. If the hash value is not below the threshold value, then the device 200 determines a new nonce string (e.g., randomly, incrementing the previous nonce, or the like) and performs the hashing operation again, and so on until a nonce is found that causes a hash value to be below the threshold, or until this round of competition expires or is cancelled. When a hash value is found that is below the threshold value, then the device 200 transmits a PoW solution message 742 back to the server 720, where the PoW solution message 742 includes at least the winning nonce string.

In FIG. 8, three branches are shown from operation 818 after the PoW problems 740 are distributed to the gaming devices 200. In branch "A", the blockchain support server 720 returns to begin 802 collecting blockchain transactions for the next round of competition at operation 810. In branch "B", the blockchain support server 720 cancels the current round of competition when another miner on the blockchain 710 has succeeded in adding a new block to the blockchain 710. More specifically, at operation 820, the server 720 receives and verifies a legitimate new block has been added to the blockchain 710 (e.g., by verifying the nonce of the new block with the contents of that new block). At operation 822, the server 720 transmits a cancellation message to each of the worker devices 200, causing those devices 200 to cease any ongoing computations on that round of competition. As such, the current round is terminated as a failure 824.

In branch "C", one of the gaming devices 200 successfully finds a nonce and resulting hash value that is below the threshold and reports that winning result back to the server 720. More specifically, at operation 830, the server 720 receives a PoW solution message 742 with a valid nonce from one of the devices 200. The server 720 may validate that nonce by similarly concatenating that nonce with the block body, hashing, and comparing to the threshold value. At operation 832, once the winning nonce has been validated, the server 720 generates a new block with the valid nonce and transmits that new block into the blockchain 710 at operation 834.

As a part of this successful mining operation, the server 720 (e.g., an account on the blockchain associated with the server 720, its operator, or the like) is awarded with a coin value on the blockchain 710, typically added as a deposit transaction into the account assigned to the server 720. At operation 836, the server 720 may distribute that mining reward. Various distribution techniques are described below. At operation 840, the current round of PoW competition is completed as successful.

Returning again to FIG. 7, in "direct" architecture embodiments, the gaming devices 200 may directly participate in the public blockchain 710. For example, the gaming devices 200 may run a public node 736 that allows the gaming device 200 to mine on the public blockchain 710, thereby similarly performing hashing of new blocks in an attempt to identify a nonce string for a PoW computation. As such, whenever a particular gaming device 200 successfully adds a new block 744 to the blockchain 710, the mining reward goes to a shared account on the blockchain 710 and may similarly be distributed.

In some embodiments, the mining worker service 732, public node 736, or private node 734 may be executed within a virtual machine (VM) running within the gaming device 200 and may be isolated from other applications (e.g., gaming applications) running on other VMs within the gaming device 200.

In some embodiments, some or all of the mining reward may be credited to a progressive jackpot (e.g., on the private blockchain 410) such as those shown and described in FIGS. 4-6. For example, a grand jackpot progressive may be provided in cryptocurrency (e.g., as a value in Bitcoin) and that jackpot value may be increased by some or all of the mining reward when the blockchain system 700 successfully mines on the public blockchain 710. In some embodiments, one or more accounts may be established and maintained to store cryptocurrency associated with one or more progressive jackpots. In such embodiments, after a mining reward is achieved, the server 720 initiate a blockchain transaction configured to transfer the mining reward, or portions thereof, from the server account to one or more of the progressive jackpot accounts on the blockchain, thus dispersing the mining reward into a blockchain account assigned to particular progressives. The gaming device(s) 200 may be configured to display an animation when a new block 744 is successfully added to the blockchain 710, thereby identifying the increase in jackpot value to nearby players. In some embodiments, some or all of the mining reward may be added to progressive jackpots in fiat currencies. For example, the blockchain system 700 may, periodically or when a mining reward is achieved, perform a transaction to sell the mining reward for fiat currency. Some or all of that fiat currency may then be applied to progressives. Thus, the computational power of idle gaming devices 200 may contribute to an increase in the value of progressives offered by the gaming devices 200, which in contributes to enhancing the value to customers and thus to increased machine utilization.

In some embodiments, some or all of the mining reward may be contributed to other uses, such as to an operator account (e.g., to subsidize operational expenses of the gaming devices 200), to a manufacturer account (e.g., to subsidize device manufacturing, sales, or deployment expenses), or the like. Such mining revenue can contribute to device profitability, which may contribute to device longevity and overall operator revenue even when the gaming revenue naturally decreases over time.

In some embodiments, mobile devices 702 of players 504 may similarly be used to contribute to PoW competitions. For example, the mobile device 702 may include a mining worker service 732 that similarly communicates with the blockchain support server 720 via the private network 704. The player 504 may elect to participate in blockchain mining and, as such, may receive PoW problem messages 740 and similarly the device 702 may perform PoW computations. The player 504 may be credited with value for participating in mining operations, such as in loyalty credits, comps (e.g., free plays), cryptocurrency value on the private blockchain 410 (e.g., in a private coin), or the like. When the mobile device 702 of the player 504 successfully identifies a nonce that is used to add a new block 744 to the blockchain 710, then some or all of the mining reward may be credited to the player 504.

The term "computer-readable medium" refers to any non-transitory storage or memory that may store computer-executable instructions or other data in a computer system and be read by a processor in the computer system. A computer-readable medium may take many forms, including but not limited to non-volatile storage or memory (such as optical or magnetic disk media, a solid-state drive, a flash drive, PROM, EPROM, and other persistent memory) and volatile memory (such as DRAM). The term "computer-readable media" excludes signals, waves, and wave forms or other intangible or transitory media that may nevertheless be readable by a computer.

While the present disclosure has been described with respect to the figures, it will be appreciated that many modifications and changes may be made by those skilled in the art without departing from the spirit of the inventions. Any variation and derivation from the above description and figures are included in the scope of the present disclosure as defined by the claims.

What is claimed is:

1. A blockchain system comprising:
   a plurality of electronic gaming devices configured to perform proof of work computations; and
   at least one processor storing instructions that, when executed, cause the at least one processor to:
   collect transaction data of a plurality of blockchain transactions from a blockchain;
   create a block body that includes at least the transaction data of the plurality of blockchain transactions;
   identify a set of electronic gaming devices from the plurality of electronic gaming devices based at least in part on an idle status of the plurality of electronic gaming devices;
   transmit a message to the set of electronic gaming devices that includes at least the block body;
   receive, from a first electronic gaming device of the set of electronic gaming devices, a success message that includes at least a nonce string;
   create a new block for the blockchain that includes at least the block body and the nonce string;
   transmit the new block into the blockchain, thereby causing the new block to be added to the blockchain;
   identify a mining reward on the blockchain based on the adding of the new block, the mining reward being in a first value of cryptocurrency supported by the blockchain; and
   execute a distribution smart contract in response to the adding of the new block, the distribution smart contract configured to allocate the first value to one or more accounts including a progressive jackpot account associated with one or more of the plurality of electronic gaming devices, the progressive jackpot being provided in the cryptocurrency.

2. The blockchain system of claim 1, wherein the instructions further cause the at least one processor to:
   compute an exchange value for the mining reward in a second currency based at least in part on the first value of cryptocurrency and an exchange rate between the cryptocurrency and the second currency; and
   cause to be displayed the exchange value, in the second currency, as a value of the progressive jackpot on one or more electronic gaming devices of the plurality of electronic gaming devices.

3. The blockchain system of claim 1, wherein the instructions are further configured to cause the at least one processor to identify the set of electronic gaming devices from the plurality of electronic gaming devices based at least in part on an affirmative idle status of the plurality of electronic gaming devices.

4. The blockchain system of claim 1, wherein the instructions are further configured to cause the at least one processor to transmit a cancel message to one or more electronic gaming devices when a new block is added to the blockchain, thereby cancelling proof of work computations currently being performed by the one or more electronic gaming devices.

5. The blockchain system of claim 1, wherein the instructions are further configured to cause the at least one processor to execute a verification smart contract to blacklist a user based upon wallet data associated with the user.

6. The blockchain system of claim 1, wherein the distribution smart contract is further configured to allocate a first portion of the first value to one or more third-party accounts and allocate the remainder of the first value to the progressive jackpot.

7. The blockchain system of claim 1, wherein allocating the first value to one or more accounts includes incrementing a progressive jackpot by executing a conversion smart contract to perform a verification of compliance with local laws and performing a blockchain transaction configured to transfer the first value from a first account to a second account on the blockchain assigned to the progressive jackpot based upon the verification.

8. A computer-implemented method comprising:
   collecting transaction data of a plurality of blockchain transactions from a blockchain;
   creating a block body that includes at least the transaction data of the plurality of blockchain transactions;
   identifying a set of electronic gaming devices from the plurality of electronic gaming devices based at least in part on an idle status of the plurality of electronic gaming devices;
   transmitting a message to the set of electronic gaming devices that includes at least the block body;
   receiving, from a first electronic gaming device of the set of electronic gaming devices, a success message that includes at least a nonce string;
   creating a new block for the blockchain that includes at least the block body and the nonce string;
   transmitting the new block into the blockchain, thereby causing the new block to be added to the blockchain;
   identifying a mining reward on the blockchain based on the adding of the new block, the mining reward being in a first value of cryptocurrency supported by the blockchain; and
   executing a distribution smart contract in response to the adding of the new block, the distribution smart contract configured to allocate the first value to one or more accounts including a progressive jackpot account associated with one or more of the plurality of electronic gaming devices, the progressive jackpot being provided in the cryptocurrency.

9. The method of claim 8 further comprising:
   computing an exchange value for the mining reward in a second currency based at least in part on the first value of cryptocurrency and an exchange rate between the cryptocurrency and the second currency; and
   causing the exchange value to be displayed, in the second currency, as a value of the progressive jackpot on one or more electronic gaming devices of the plurality of electronic gaming devices.

10. The method of claim 8 further comprising identifying the set of electronic gaming devices from the plurality of electronic gaming devices based at least in part on an affirmative idle status of the plurality of electronic gaming devices.

11. The method of claim 8 further comprising transmitting a cancel message to one or more electronic gaming devices when a new block is added to the blockchain, thereby cancelling proof of work computations currently being performed by the one or more electronic gaming devices.

12. The method of claim 8 further comprising executing a verification smart contract to blacklist a user based upon wallet data associated with the user.

13. The method of claim 8 further comprising verifying that the nonce string satisfies a proof of work by concatenating the block body with the nonce string to generate a concatenated string, hashing the concatenated string to generate a resultant value, and comparing the resultant value to a predetermined threshold to verify that the resultant value is below the predetermined threshold.

14. The method of claim 8, wherein allocating the first value to one or more accounts includes incrementing a progressive jackpot by executing a conversion smart contract to perform a verification of compliance with local laws and performing a blockchain transaction configured to transfer the first value from a first account to a second account on the blockchain assigned to the progressive jackpot based upon the verification.

15. A non-transitory, computer-readable medium storing instructions that, when executed by at least one processor, cause the at least one processor to:
   collect transaction data of a plurality of blockchain transactions from a blockchain;
   create a block body that includes at least the transaction data of the plurality of blockchain transactions;
   identify a set of electronic gaming devices from the plurality of electronic gaming devices based at least in part on an idle status of the plurality of electronic gaming devices;
   transmit a message to the set of electronic gaming devices that includes at least the block body;
   receive, from a first electronic gaming device of the set of electronic gaming devices, a success message that includes at least a nonce string;
   create a new block for the blockchain that includes at least the block body and the nonce string;
   transmit the new block into the blockchain, thereby causing the new block to be added to the blockchain;
   identify a mining reward on the blockchain based on the adding of the new block, the mining reward being in a first value of cryptocurrency supported by the blockchain; and
   execute a distribution smart contract in response to the adding of the new block, the distribution smart contract configured to allocate the first value to one or more accounts including a progressive jackpot account associated with one or more of the plurality of electronic gaming devices, the progressive jackpot being provided in the cryptocurrency.

16. The non-transitory, computer-readable medium of claim 15, wherein the instructions further cause the at least one processor to:
   compute an exchange value for the mining reward in a second currency based at least in part on the first value of cryptocurrency and an exchange rate between the cryptocurrency and the second currency; and
   display the exchange value, in the second currency, as a value of the progressive jackpot on one or more electronic gaming devices of the plurality of electronic gaming devices.

17. The non-transitory, computer-readable medium of claim 15, wherein the instructions further cause the at least one processor to identify the set of electronic gaming devices from the plurality of electronic gaming devices based at least in part on an affirmative idle status of the plurality of electronic gaming devices.

18. The non-transitory, computer-readable medium of claim 15, wherein the instructions further cause the at least one processor to transmit a cancel message to one or more electronic gaming devices when a new block is added to the blockchain, thereby cancelling proof of work computations currently being performed by the one or more electronic gaming devices.

19. The non-transitory, computer-readable medium of claim 15, wherein the instructions further cause the at least one processor to execute a verification smart contract to blacklist a user based upon wallet data associated with the user.

20. The non-transitory, computer-readable medium of claim 15, wherein allocating the first value to one or more accounts includes incrementing a progressive jackpot by executing a conversion smart contract to perform a verification of compliance with local laws and performing a blockchain transaction configured to transfer the first value from a first account to a second account on the blockchain assigned to the progressive jackpot based upon the verification.

* * * * *